United States Patent [19]

Mulla

[11] Patent Number: 5,870,387
[45] Date of Patent: Feb. 9, 1999

[54] METHOD AND APPARATUS FOR INITIALIZING A RING

[75] Inventor: Dean A Mulla, Fort Collins, Colo.

[73] Assignee: Hewlett-Packard Company, Palo Alto, Calif.

[21] Appl. No.: 775,676

[22] Filed: Dec. 31, 1996

[51] Int. Cl.⁶ .................................................. G06F 12/00
[52] U.S. Cl. ........................ 370/258; 370/254; 370/403; 370/404; 370/458; 370/468; 340/825.05; 395/200.3; 395/200.52; 395/200.79; 395/200.81
[58] Field of Search ...................... 340/825.05, 825.06, 340/825.07; 370/254, 258, 403, 404, 458, 468; 395/200.3, 200.52, 200.79, 200.81

[56] References Cited

U.S. PATENT DOCUMENTS

| | | | |
|---|---|---|---|
| 4,858,232 | 8/1989 | Diaz et al. ................................. | 370/86 |
| 5,003,533 | 3/1991 | Watanabe ................................ | 370/85.5 |
| 5,457,683 | 10/1995 | Robins ..................................... | 370/60 |
| 5,483,535 | 1/1996 | McMillen et al. ..................... | 370/85.1 |
| 5,490,145 | 2/1996 | Tanabe et al. .......................... | 370/85.4 |
| 5,526,356 | 6/1996 | Kim et al. ............................. | 370/85.15 |
| 5,551,048 | 8/1996 | Steely, Jr. ................................. | 395/800 |
| 5,592,484 | 1/1997 | Albano et al. .......................... | 370/452 |

*Primary Examiner*—Brian Zimmerman
*Assistant Examiner*—Yonel Beaulieu

[57] ABSTRACT

A technique for initializing a communications network having a ring topology chooses a ring master for each ring. The ring master communicates with all network nodes to assign each node a unique number. Upon power up, after all system clocks become stable, the ring master asserts a line that is normally used to delineate slots by holding the line for a predetermined amount of time. When a node is ready for operation, i.e. it has performed an internal reset procedure, and receives the asserted signal, it forwards such signal. Subsequent receipt of the asserted signal by the ring master indicates that the ring is operating properly.

28 Claims, 6 Drawing Sheets

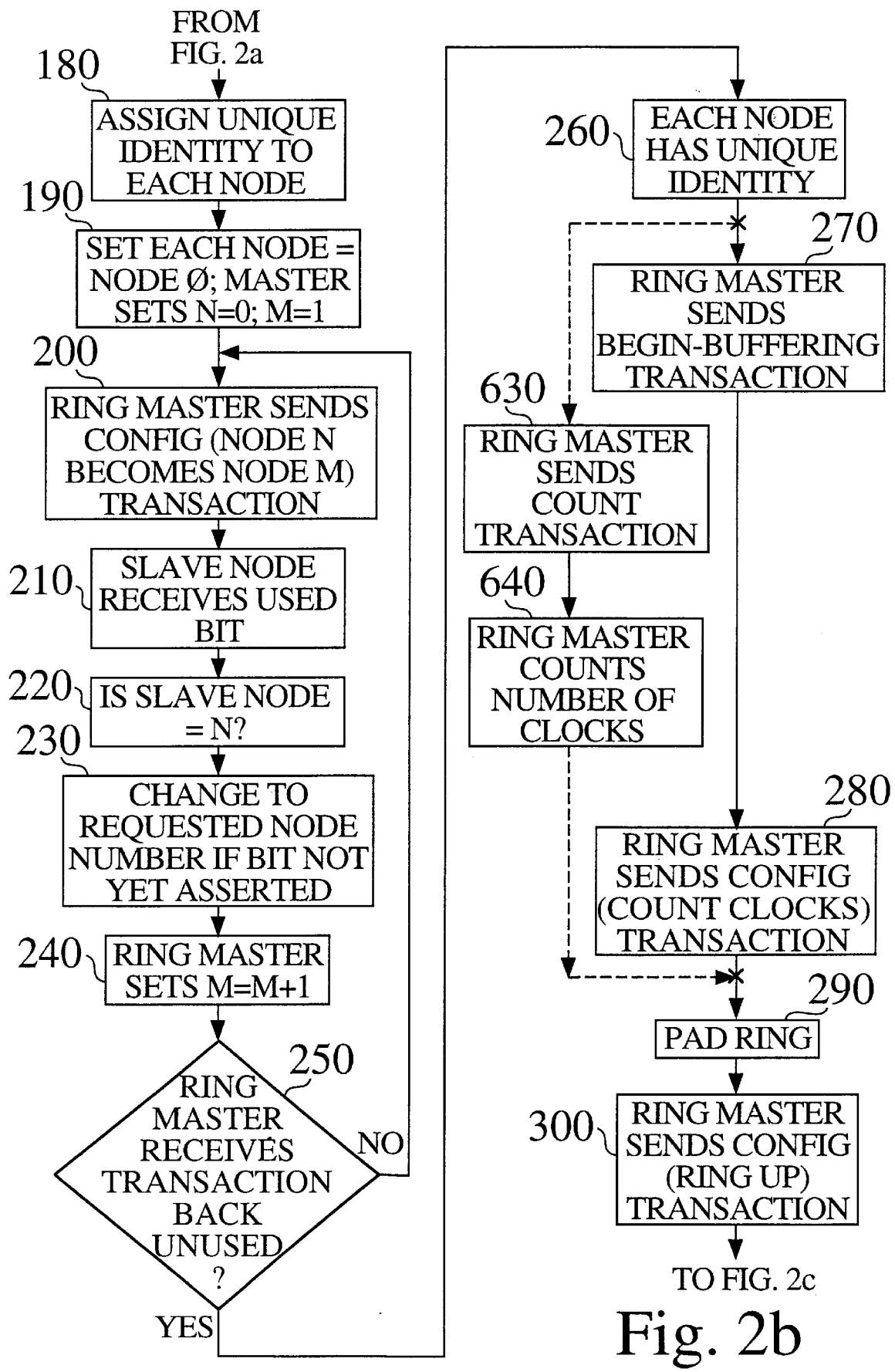

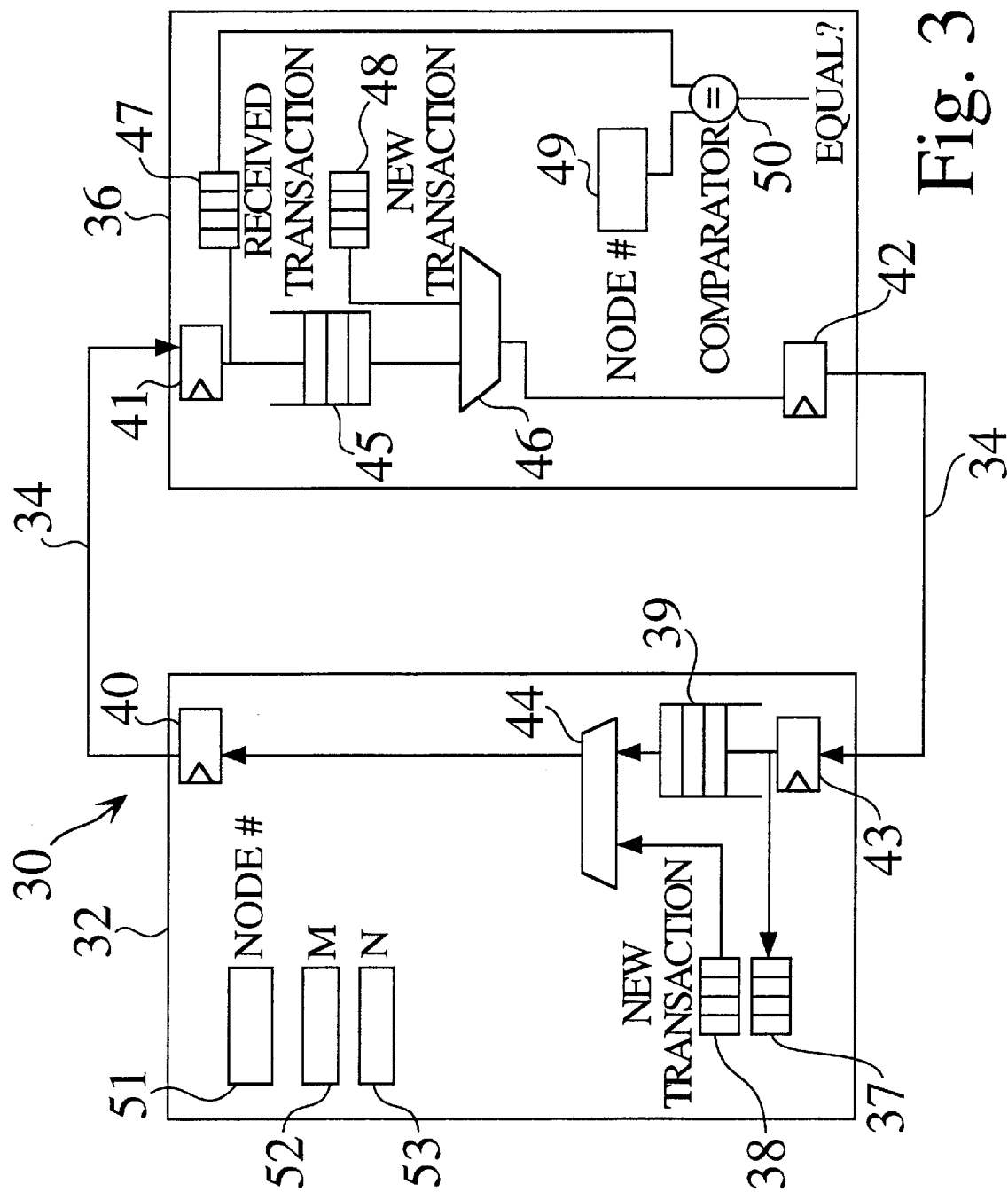

METHOD AND APPARATUS FOR INITIALIZING A RING

BACKGROUND OF THE INVENTION

1. Technical Field

The invention relates to communications network protocols. More particularly, the invention relates to initialization protocols for communications networks that have a ring topology.

2. Description of the Prior Art

The next generation of CPUs will bring with it a significant increase in both instruction level parallelism and clock frequency. The system infrastructure that supports these processors must therefore supply much higher I/O and main memory bandwidths than are presently available. Such CPUs must also exploit a considerably greater degree of parallelism in accessing main memory, to compensate for the increasing imbalance between processor speed and memory latency, thereby also driving up main memory bandwidth requirements. It is thus unlikely that the needs of even moderately demanding applications—commercial or technical—will be satisfied by bus-based solutions in this time frame.

Consequently, much attention is being given to ring networks as the next best hope for solving the bandwidth problem. A ring topology is inherently a communications network topology where all nodes are equal in connectivity. FIG. 1 is a block level schematic diagram of a typical ring configuration 10 in which several processors 11–14 and memory modules 15–17 appear as individual nodes on a network ring 18.

One problem associated with a ring network is that of ring initialization. Ring initialization using the fewest number of device package pins is difficult, but necessary because the device package is often the most expensive portion of the device and adding pins to the device package adds significantly to the device cost. Overhead associated with ring initialization ideally should have minimal impact on the implementation and packaging cost of a ring system.

It is possible to place several copies of the boot code used for initialization in the system, for example, one on each bus. This, however, adds unnecessarily to the final system cost. In addition, if the boot code also has a portion of non-volatile memory functionality present, then there is the problem that there may be the architectural appearance of more than one copy of boot code in the system.

If the processor contains the boot code and non-volatile memory, then for a uniprocessor implementation, there is a very simple known mechanism for fetching and executing the boot code and performing non-volatile memory loads and stores. However, in a multiprocessor system, there is a difficulty that the other processors must locate the processor containing the boot code and send instruction fetches to that processor. That processor must then respond to those instruction fetches.

Additionally, in a multiprocessor configuration, a processor associated with each node, containing a CPU and a bus, must be sufficiently initialized to forward and return instruction fetches. Placing the initialization boot code on one such processor implies that the one given processor bus has an almost direct connection to the boot memory interface. Other processors, however, must also be able to send instruction fetches into the ring.

The anticipated benefits of a ring topology are straightforward. Because each electrical connection is point-to-point, much higher signal rates, and thus more bandwidth per pin, can be achieved. Because the system clock is propagated along with the data, along matched paths, only the relative skew between signals must be managed, and not the sum total of skew and propagation delay between devices. This too may contribute to higher clock rates, and should remove some of the need for very tight packaging geometries required when bus-based solutions are pushed to their limit.

In view of the many merits of a ring network, it would be advantageous to optimize all aspects of the ring architecture. It would therefore be advantageous to provide a fast and reliable, low overhead ring initialization scheme.

SUMMARY OF THE INVENTION

The invention provides a protocol for initializing a communications network having a ring topology. The ring topology may comprise a single ring, or there may be multiple interleaved rings having one or more nodes that are connected to a plurality of such multiple rings. In operation, a ring master is first chosen for each ring. The ring master communicates with all network nodes to assign each node a number. Upon power up, after all system clocks become stable, the ring master asserts a line that is normally used to delineate slots by holding the line for a significant, fixed amount of time. When a node is ready for operation, i.e. it has performed an internal reset procedure, and receives the asserted signal, it then forwards such signal to the next node on the ring.

Subsequent receipt of the asserted signal by the ring master indicates that the ring is operating properly. At this time, the ring is then padded, i.e. buffers are added to the ring as necessary to give the ring the appearance of the appropriate number of slots required for proper signal propagation, and a unique identity is assigned to each node. Padding also serves to resolve various clock skew issues.

Because the padding algorithm may depend upon the number of nodes in the ring, identity assignment is preferably performed first. To accomplish identity assignment, the ring master broadcasts a config (set node # to 0) transaction, such that all nodes are set to node 0. The ring master also sets counter values N=0 and M=1. Next, the master sends a transaction that sets node N to node M. Each slave node compares the transaction value to determine if it is node N, and if it is node N, then it unconditionally asserts the transaction taken value on its output. If the transaction taken value has not already been asserted, the slave node performs the requested change of node number. The master then sets M=M+1 and continues this process until it receives its own transaction back unused, indicating that there are M nodes on the ring, where the ring master is node 0.

The ring master then sends a begin buffering transaction to assure that the number of clock cycles on the ring is kept constant. This is also referred to as padding. The ring master sends a count clocks transaction to count the number of clocks on the ring after buffering is begun. When ring master knows how many clocks reside on the ring, that ring is initialized. The ring master then sends a ring up transaction that notifies all nodes the ring is ready for use for normal boot up transactions. When the ring master receives its own ring up transaction from any of its rings, it begins to forward any transactions it receives on that and/or any other rings that are up.

BRIEF DESCRIPTION OF THE DRAWINGS

FIGS. 2a–2c provide a flow diagram showing a ring initialization sequence according to the invention;

FIG. 3 is a block schematic diagram of a ring network, showing a ring master and non-master, that incorporates a ring initialization scheme according to the invention;

DETAILED DESCRIPTION OF THE INVENTION

The invention herein disclosed provides a novel solution for ring initialization up to the point in the initialization cycle of fetching the first instructions across the network fabric. In the preferred embodiment of the invention, only one copy of boot ROM and control interface exist in any given system. It is therefore preferred that there is only one copy of the boot ROM. The preferred embodiment of the invention performs such ring initialization on all associated rings in parallel (e.g. in a network comprising interleaved rings), thereby improving the speed of network initialization.

When power is applied to a system, each processor begins fetching code. No devices are yet configured. For the processors to execute selftest, each processor must be nominally able to initialize itself to boot the system. This implies the ring also must be initialized and functional, even if at a reduced bandwidth capability.

To initialize the ring, a ring master must be chosen for each ring. In addition, the ring must be able to communicate with all nodes to assign each a node number for each ring on which it resides. Without some method of distinguishing the ring master, very little progress is possible during ring initialization. Two methods that are used to identify a master are referred to as scan and single pin. Scan is not satisfactory because it requires external hardware. While a single pin can be used, the system is then required to assert the pin in exactly one of the device types that supports master capability. Therefore, a single pin is required to determine which processor is the master of each of the rings passing through it.

In an interleaved system, e.g. where there is more than one ring for at least one node, each interleave cluster must have one node as master for the each ring passing through it. This provides a single master for every ring in the system. Note that because each node interfacing to the ring can have more than one ring passing through it, there may be more than one master in the system. A key consideration is that each ring have exactly one master. This implies that a node having more than one ring interface is a master on all the rings to which it interfaces.

Figure 1:
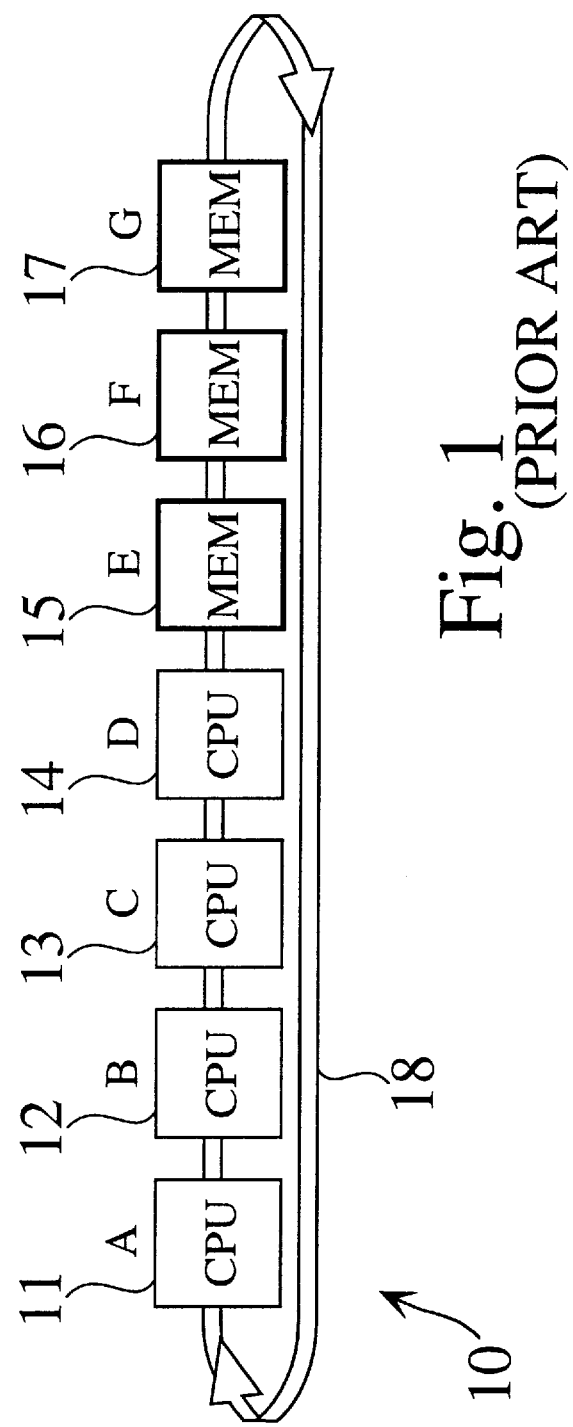
FIG. 1 is a block schematic diagram of a typical ring configuration.
Figure 2A:
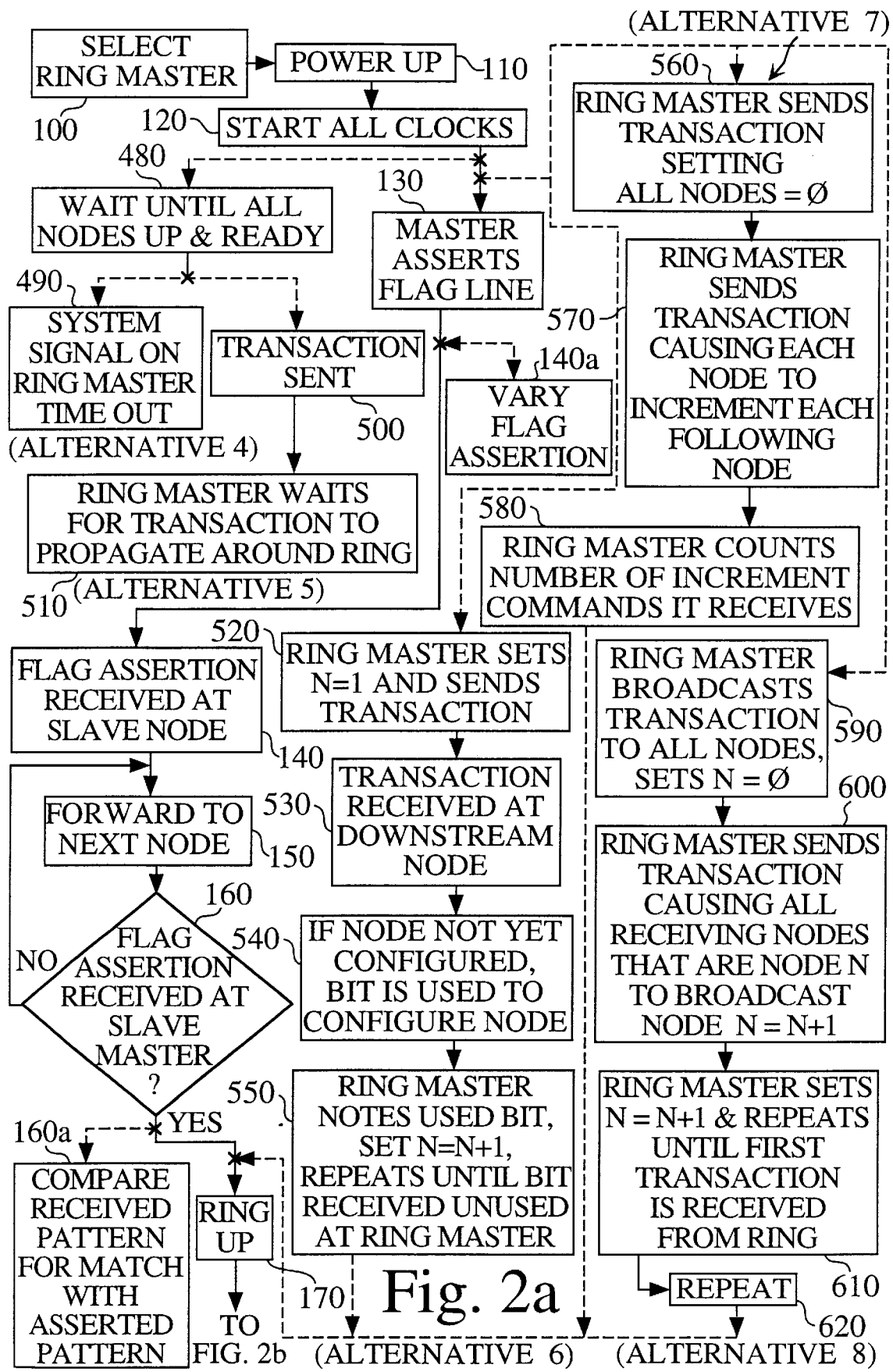
Figure 2C:
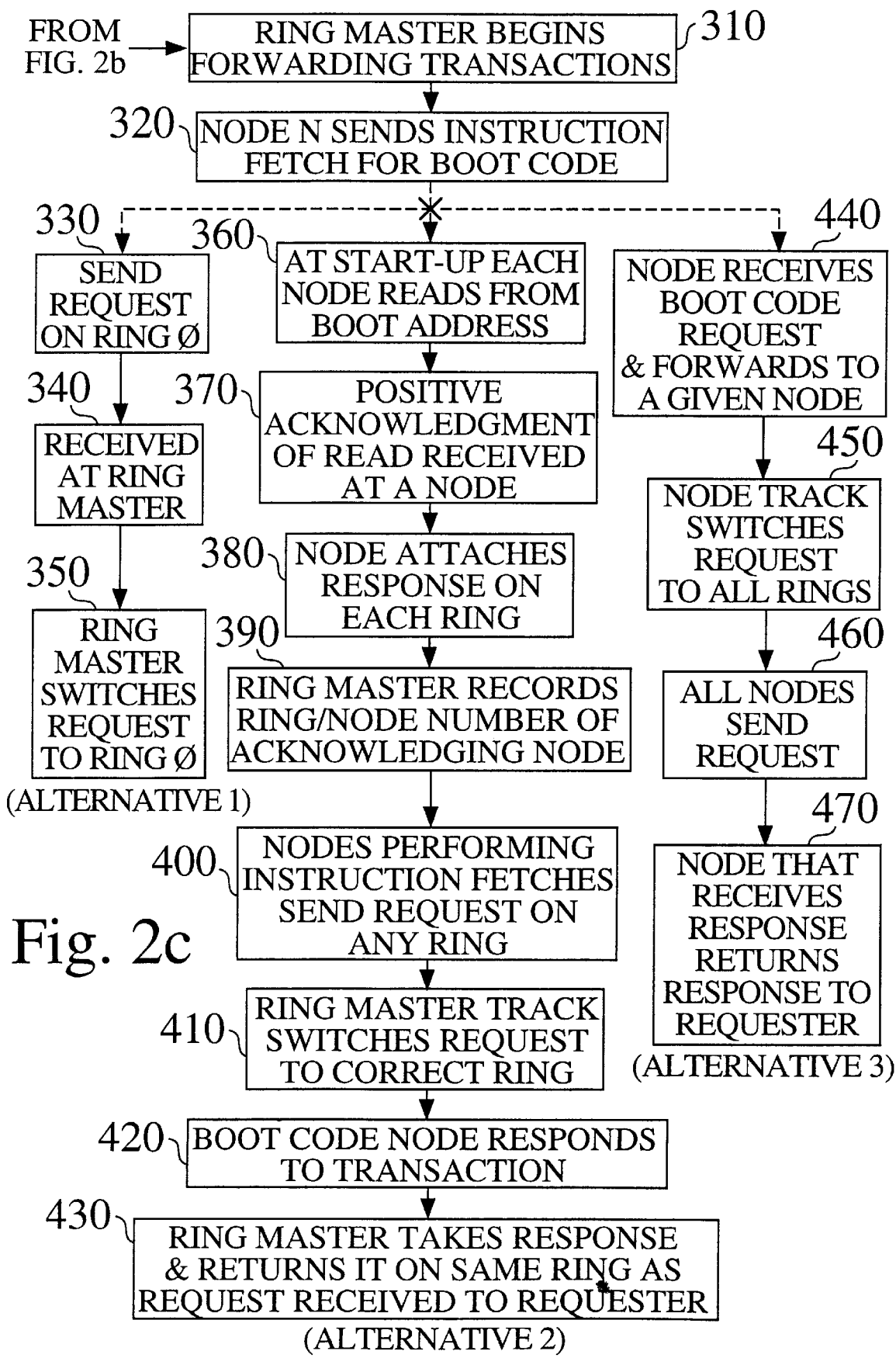

FIGS. 2a–2c provide a flow diagram showing a ring initialization sequence according to the invention. The preferred ring initialization sequence is as follows:

A ring master is chosen (100), as discussed above. Upon power up (110), all clocks are started (120). When the clocks are usable, the ring master for each ring asserts a FLAG line (130) that is normally used to delineate slots. The ring master holds this line for a fixed, preferably large, amount of time on the order of milliseconds. When a node is ready for operation, i.e. it has performed all of its internal reset procedures, and receives the FLAG asserted signal (140), it forwards the signal over the ring (150). When the ring master receives the FLAG assertion (160), it knows the ring is operating properly (170) because each node has received the FLAG assertion and forwarded same along the ring. However, due to the difficulty in knowing whether or not all of the power supplies are fully operational or not, the ring master must wait a long period of time for the FLAG signal to stabilize at the asserted level. For example, the ring master might wait the length of time required for a counter, such as a 32 bit counter, to overflow, which is about 8 seconds to overflow at 2 ns cycles.

In an alternative embodiment of the invention, the ring master varies the FLAG signal (140a) in either a predefined or pseudo-random series of states during the wait time, and requires all nodes to forward the signal as received. The ring master then expects to receive the same pattern it is sending, but delayed by some amount of ring transit time. When this pattern is received correct (160a) for the duration of the wait time-out, the master knows that the ring is up and functional (170).

At this time, either the ring should be padded to the right number of slots, or unique identities should be assigned to each of the nodes. It is not critical which of these two operations is performed first, but it is thought that the padding scheme may depend upon the number of nodes present in the ring, and therefore node identity assignment (180) is preferably performed first.

The ring master broadcasts a CONFIG (set node # to 0) transaction across the ring. As a result of this transaction, all nodes become node 0 (190). The ring master also sets counters N=0 and M=1.

Next, the ring master sends a CONFIG (node N become node M) transaction (200). The ring master includes the values for both N and M in the transaction, such that the slave nodes do not require a counter. When a slave node receives the CONFIG (node N become node M) transaction (210), the transaction is buffered. At a later slot, e.g. one slot later, the slave node receives a used bit. During this time, the slave node performs a compare operation to determine if it is node N. If it is node N, then it unconditionally asserts the used bit on its output, and examines the used bit it receives (220). If the used bit it receives has not already been asserted, the slave node performs the requested change of node number (230). If it is not node N, then it passes the used bit it receives unchanged.

When the ring mater receives the transaction back, the ring master then sets M=M+1 (240), and repeats the three previous steps until it receives its own transaction back unused (250), indicating that there are M nodes on the ring (260), where the ring master is node 0. This scheme adds no more logic to each processor than any known scheme, but allows the minimum of logic on any node in the system.

The ring master then sends a CONFIG (begin buffering) transaction (270), and all nodes use half of their buffering capability. For proper operation of the ring, the phase of the ring clocks must never change so much that a node buffer over- or under-flows. Additionally, the number of clocks on the ring must be kept consistent with the available buffering capability.

Because it may be possible that ring buffering is distributed across multiple nodes, the method used to determine how many ring buffer clocks are needed must be able to determine how many buffer elements exist on each node. Such scheme is sufficiently difficult that it is typically not practical to use system hardware to determine the optimum number of buffering elements. Therefore, the preferred embodiment of the invention provides a scheme, e.g. boot software, that determines the optimum number of buffering elements for a given ring, where boot up uses one-half of the buffers to allow for variations introduced by propagation delays.

The ring master then sends a CONFIG (count clocks) transaction (280) that counts the number of clocks on the ring after the buffering is begun. This transaction can be any idle transaction. When this transaction returns to the ring master, the ring master knows how many clocks reside on the ring. At this point in time, all nodes are initialized, they all have a unique identity, and there are several slots associated with the ring (290).

The ring master next sends a CONFIG (ring up) transaction (300) to notify all nodes that the ring is up and ready for use for normal boot up transactions.

When the ring master receives its own CONFIG (ring up) transaction, it completes the ring by no longer sinking all transactions, i.e. it begins to forward transactions it receives through its buffering elements (310).

When a given node receives a CONFIG (ring up) transaction on a ring, it may send a CPU initiated instruction fetch over that ring (320). There are three alternative schemes (discussed below) that may be used to reach the node containing the boot ROM interface. The first scheme constrains the system configuration, but provides good performance, and makes implementation simplest. The second scheme has better performance in booting a multiprocessor system than the third scheme because there are no broadcasts, but additional complexity is necessary in each of the nodes because the nodes must remember and do more during their initialization sequences. Because there are likely more correctness and verification issues associated with the second and third schemes, the first scheme is the preferred solution Alternative 1

When a node sends a request, it does so on ring 0 (330). When that request reaches the ring master for that ring (340), the ring master track switches the request to its ring 0 (350), i.e. the ring master routes a transaction from one ring to another in a system having interleaved rings to allow transactions to travel between nodes that are not present on the same ring.

The system is preferably built with all boot ROM interfaces residing on ring 0 of the ring master. Therefore, one node should be designated as the overall ring master. The node having the boot ROM interface can either be hardwired as node 1 on that ring—the simplest configuration, or it can dynamically assigned, i.e. not fixed. If the boot ROM location is not fixed, then some part of the second and third scheme described below must be used to locate the actual boot ROM. This adds complexity to the system, and may not add any value to the system.

Alternative 2

During boot up of the ring, each node reads from the boot address (360). It is assumed that system boot address aliasing is done at the boot ROM interface, and that a single address can be used in all nodes of the system at this point. One node receives a positive acknowledgment of its read (370). This node attaches a positive response to a CONFIG (4)(N) transaction on each ring (380). The ring master for each ring now knows the node number which contains the boot ROM interface, and is therefore able to direct all requests to the correct node on the correct ring. The ring master records the ring number and node number of this node (390).

Nodes that are performing instruction fetches (and data fetches) send their fetch requests on any ring—this ring can be a constant ring each time, or it can be a different ring each time (400). Upon receiving the instruction fetch request, the ring master track switches the request to the correct ring (410) and designates the transaction for the node containing the boot ROM code (node N). It is not critical which node receives the transaction, because all ring masters know to which ring to send the request.

The node having the boot code takes the transaction, and responds to the transaction on the same ring on which it receives the transaction (420). The ring master takes this response and returns it on the same ring on which the ring master received the request, such that the response is thus sent to the requestor (430).

Alternative 3

This alternative uses broadcasts, and does not record the location of the boot ROM interface. When a node receives a request for boot ROM instructions or data, it forwards the request to a given node (440), which is the ring master of the ring. This node then track switches the request to all rings (450). All nodes then send the request onto their bus (460). The node that receives a response to the request sends the response to the node on the ring on which it received the request (470). The node sends the response to the requester on the requestor's ring.

Other Alternatives

For waiting until all nodes are up and ready (480).

Alternative 4

A system signal is used on the ring master pin to specify that enough time has passed, such that all rings should be functional (490). This approach may be used instead of the first FLAG assertion scheme discussed above. This approach, however, is not preferred because it requires all power supplies to send status information to the ring master before the ring master knows it can proceed.

Alternative 5

A CONFIG (1) transaction is sent (500) and the ring master waits for the transaction to propagate around the ring (510) before going on to CONFIG (2). This implies that each node does not send a CONFIG (1) transaction until it receives a CONFIG (1). This scheme is similar to the single wire FLAG bit scheme discussed above. Therefore, the FLAG solution is preferred.

For determining the number of nodes on the ring.

Alternative 6

To fetch instructions, each node should have a unique node identification to allow arbitration and track switching to work. The ring master sets N=1 and then sends a CONFIG (4)(N) transaction (520). The downstream recipient node receives the transaction (530), and if the recipient node has not already been configured, the recipient node sets a used bit in a following slot. If the recipient node is not already configured and if the used bit that it set is not already set when received, then the node configures itself as node N on that ring (540).

The ring master receives the CONFIG (4)(N) transaction, notes the used bit, and sets N=N+1. The foregoing steps are repeated until the ring master receives a CONFIG (4)(N) transaction without a used bit set (550), at which time the ring master knows that there are N nodes in this ring, where the ring master is node 0.

Alternative 7

The ring master sends a CONFIG (set to 0) transaction causing all nodes to become node 0 (560). The ring master then sends a CONFIG (generate incr command) transaction that causes each recipient node to generate a command that requires the recipient node to increment its node number by one (570). Alternatively, each node performs this step on its own. The ring master also generates a CONFIG (incr) transaction. At this time, the ring master is still sinking all transactions and is therefore not forwarding transactions around the ring. As a result, the ring master is node 0, the next downstream neighbor is node 1, and the node numbers are incremented around the ring in a linear fashion.

In this scheme, the ring master knows how many nodes are present in the ring by counting the number of increment commands it receives (580). If the ring master receives N increment commands, then there are N nodes on the ring. This includes receiving the CONFIG (incr) transaction that the ring master itself generated. This alternative requires the nodes to arbitrate for the ring at this early stage so that no transactions are lost, or else duplicate node numbers may result.

Alternative 8

The ring master broadcasts a CONFIG (set to 0) transaction to all nodes. It also sets N=0 (590). The ring master then sends a CONFIG (node N tell node N to become node N+1) transaction. This causes all receiving nodes that are currently node N to broadcast a CONFIG (node N become node N+1) transaction (600). The ring master then sets N=N+1, and repeats the foregoing steps until it receives its CONFIG (node N tell node N to become node N+1) (610). The ring master knows there are N+1 nodes on the ring, including itself, and that it is node N+1.

After the first broadcast scenario, the ring master node number is unknown. The next downstream neighbor is node 1, and all other nodes are node 2. In successive iterations (620), a monotonically increasing node number list is created, in which no duplicates are present. Individual nodes only need to implement a comparator and a generator of the broadcast transaction upon command. Arbitration is not needed because it is acceptable in this scheme if the nodes interfere with transactions from other nodes.

For determining how many clocks exist in transit around the ring.

The ring master sends a CONFIG (count) transaction (630), and counts the number of ring clocks until the CONFIG (count) transaction returns to the ring master (640). This can be effectively an idle transaction.

FIG. 3 is a block schematic diagram of a ring network 30, showing a ring master node 32 and non-master node 36, and that incorporates a ring initialization scheme according to the invention. While a single non-master is shown in the figure, it should be appreciated that a typical ring includes a plurality of such non-masters.

The ring master 32 and non-master 36 each include input buffers 43, 41, respectively, output buffers 40, 42, respectively, and a padding buffer/queue 39, 45, respectively. The ring master 32 for each ring in the ring topology 34 communicates with all network nodes 36 to assign each node a unique node number. The ring master includes a means 40/44 for asserting a signal by holding a line 34 for a predetermined length of time upon system power up, after all system clocks become stable. Means 41/47 are provided at each non-master node for receiving the asserted signal at each node when said node is ready for operation. The non-master also includes means 46/42 for forwarding the asserted signal, such that subsequent receipt of the asserted signal by the ring master indicates that the ring is operating properly.

The ring master 32 pads the ring to a correct number of slots and assigns a unique identity to each node on the ring (as discussed above). The ring master also determines how many nodes are on the ring by broadcasting a transaction 38 that sets all nodes to node 0. The ring master include a uniquely identified node # 51 and also sets the values of counter N (52) to N=0 and M (53) to M=1. The ring master then sends a transaction 38 which is received as a transaction 47 at the non-master, such that node N becomes node M.

The non-master includes means 49/50 for comparing the transaction 47 value to determine if the node is node N, and if it is node N, then unconditionally asserting the transaction used value on the node output; and if the transaction used value has not already been asserted, then performing the requested change of node number at the node. The ring master then sets counter M=M+1 and continues until the ring master receives the transaction 37 back unused, indicating that there are M nodes on the ring, where that the ring master is node 0.

The ring master sends a begin buffering transaction to assure that a number of clock cycles on the ring is kept constant. Thus, the ring master includes means 44/40 for sending a count clocks transaction 38 to count a number of clocks on the ring after buffering is begun. The ring master then initializes all nodes on said ring when the ring master knows how many clocks reside on the ring and sends a ring up transaction, which notifies all nodes that the ring is ready for use for normal boot up transactions. The ring master begins to forward any transactions the ring master receives after the ring master receives its own ring up transaction from the ring.

Figure 4:
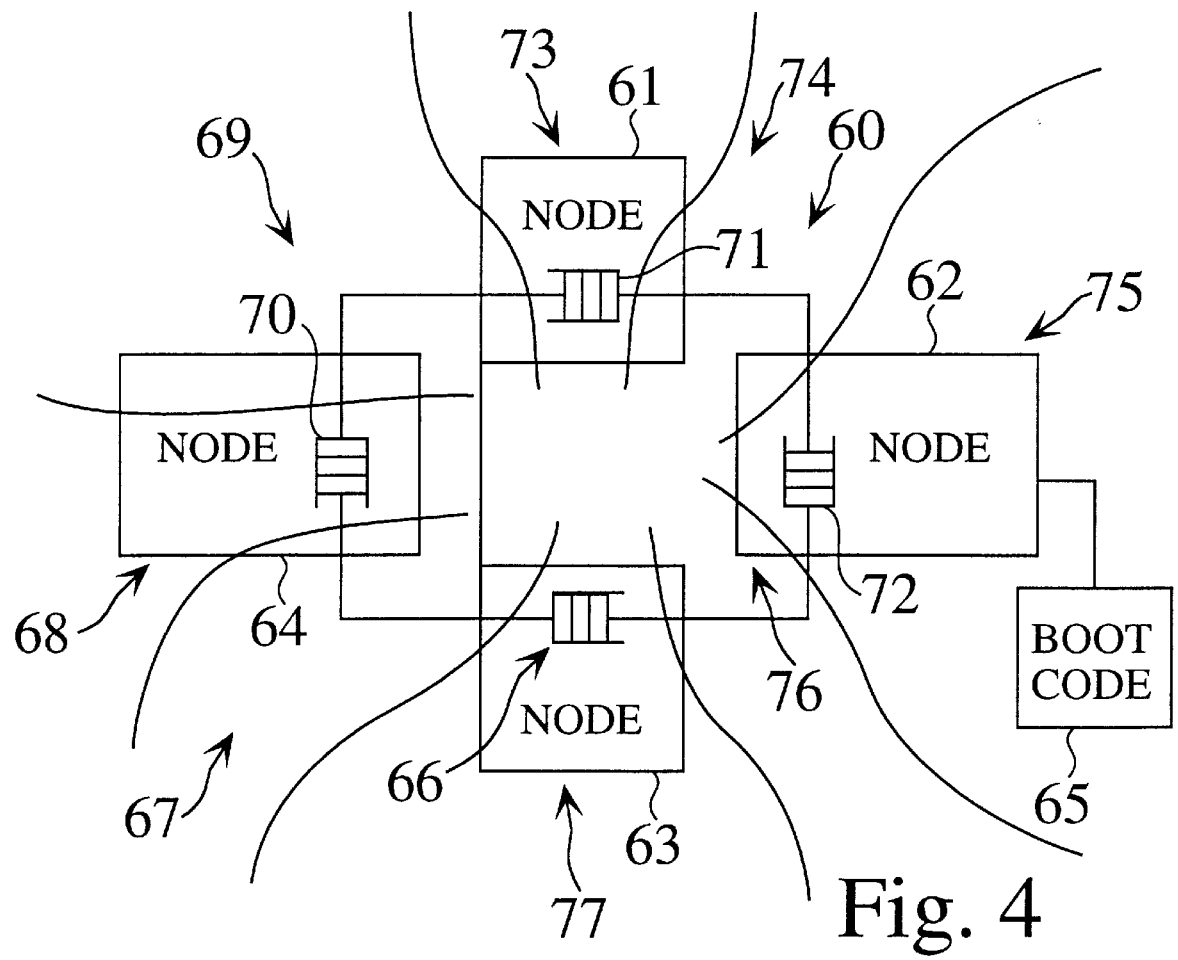
FIG. 4 is a block diagram of a ring network showing padding and slots for transactions, where the ring network has a single location for the network boot code.

FIG. 4 is a block diagram of a ring network 60 showing padding and slots for transactions, where the ring network has a single location for the network boot code 65. In the figure, the several nodes 61, 62, 63, 64 that comprise the ring network each include a padding buffer/queue 71, 72, 63, 70, respectively. The nodes are configured such that three clocks, e.g. 67, 68, 69 for the node 64, make up one slot. Thus, the node 61 comprises three clock cycles 73, 74, 75 respectively. Node 63 includes two clock cycles 76, 77 and is therefore padded, i.e. one clock cycle is added, such that the correct number of clock cycles occur for the slot to forward a transaction in transit about the ring correctly. Such padding also improves clock skewing. In other embodiments of the invention, more or fewer clocks may be provided, depending upon the ring protocol.

Figure 5:
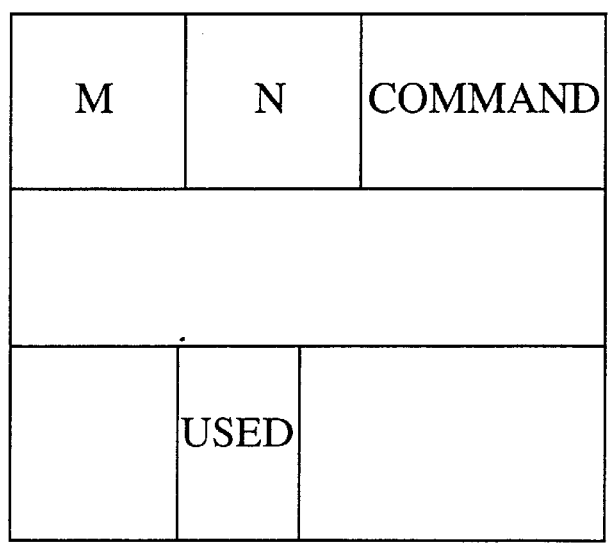
FIG. 5 is a configuration packet diagram for a three clock slot.

FIG. 5 is a configuration packet diagram for a three clock slot. In the figure, the contents of counters M and N and a command are contained in the configuration packet during clock 1 in a three clock slot. Clock 2 is used to compute a response which is then issued to a next node during clock 3. In this example, the N counter position shows a used bit, indicating that the node that processed the transaction was set to N.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A method for initializing a communications network having a ring topology, comprising the steps of:

choosing a ring master for each ring in said ring topology, wherein the ring master communicates with all network nodes to assign each node a unique node number;

asserting a signal with said ring master by holding a line for a predetermined length of time upon system power up, after all system clocks become stable;

receiving said asserted signal at each node when said node is ready for operation; and forwarding said asserted signal, wherein subsequent receipt of the asserted signal by the ring master indicates that the ring is operating properly.

2. The method of claim 1, further comprising in no particular order the steps of:

padding the ring to a correct number of slots; and assigning a unique identity to each node on the ring.

3. The method of claim 1, further comprising the steps of:

determining how many nodes are on the ring.

4. The method of claim 3, said determining step further comprising the steps of:

broadcasting with said ring master a transaction that sets all nodes to node 0;

setting with said ring master values N=0 and M=1;

sending a transaction with said ring master such that node N becomes node M;

comparing with each node a transaction value to determine if the node is node N, and if it is node N, then unconditionally asserting the transaction used value on the node output; and if the transaction used value has not already been asserted, then performing the requested change of node number at said node; and passing the used value unchanged if it is not node N;

setting with the ring master M=M+1; and continuing until said ring master receives said transaction back unused, indicating that there are M nodes on the ring, where the ring master is node 0.

5. The method of claim 2, wherein said padding step further comprises the steps of:

sending with said ring master a begin buffering transaction to assure that a number of clock cycles on the ring is kept constant;

sending with said ring master a count clocks transaction to count a number of clocks on the ring after buffering is begun;

initializing all nodes on said ring when said ring master knows how many clocks reside on the ring;

sending with said ring master a ring up transaction, which notifies all nodes that the ring is ready for use for normal boot up transactions; and beginning to forward any transactions said ring master receives when the ring master receives its own ring up transaction from the ring.

6. The method of claim 1, further comprising the steps of:

sending a fetch request from a node; and track switching said request when the request reaches the ring master.

7. The method of claim 1, further comprising the steps of:

reading from a boot address at each node;

receiving a positive acknowledgment at one node of its read;

attaching a positive response to a transaction with said one node;

directing all requests to the correct node on the correct ring with said ring master;

sending requests for fetches on any ring for nodes that are performing instruction fetches;

track switching said requests to a correct ring with said ring master upon receiving the instruction fetch request;

designating a transaction for a node containing a boot code;

taking the transaction with the node having the boot code;

responding to the transaction on the same ring on which it is received;

taking the response with the ring master; and returning the response on the same ring on which the ring master received the request, such that the response is thus sent to the requester.

8. The method of claim 1, further comprising the steps of:

forwarding a request to a given node when a node receives a request for boot instructions or data;

track switching the request with said given node to all rings;

sending the request with all nodes onto respective node buses; and sending the response to the given node on the ring on which it was received from the node that receives a response to the request.

9. The method of claim 1, further comprising the step of:

providing a system signal to said ring master to specify that sufficient time has passed, such that all rings are functional.

10. The method of claim 1, further comprising the steps of:

setting N=1 with the ring master;

sending a transaction with the ring master;

receiving said transaction at a downstream recipient node;

setting a used bit in a following slot if the recipient node has not already been configured;

configuring the recipient node as node N if the recipient node is not already configured and the used bit that it set is not already set when received;

receiving the transaction at the ring master;

noting the used bit at the ring master;

setting N=N+1; and repeating the foregoing steps until the ring master receives a transaction without a used bit set.

11. The method of claim 1, further comprising the steps of:

sending a first transaction with the ring master that causes all nodes to become node 0;

sending a second transaction with the ring master that causes each recipient node to generate a command that requires the recipient node to increment its node number by one; and counting with the ring master the number of increment commands it receives;

wherein the ring master is node 0, a next downstream neighbor is node 1, and node numbers are incremented around the ring in a linear fashion.

12. The method of claim 1, further comprising the steps of:

broadcasting a CONFIG (set to 0) transaction to all nodes with said ring master;

setting N=0 with said ring master;

sending a CONFIG (node N tell node N to become node N+1) transaction with said ring master that causes all receiving nodes that are currently node N to broadcast a CONFIG (node N become node N+1) transaction;

setting N=N+1 with said ring master;

repeating the foregoing steps until the ring master receives its CONFIG (node N tell node N to become node N+1); and creating a monotonically increasing node number list in successive iterations, in which no duplicates are present.

13. The method of claim 1, further comprising the steps of:

sending a transaction with the ring master; and counting a number of ring clocks at the ring master until the transaction returns to the ring master.

14. A method for determining how many nodes are on a ring, comprising the steps of:

broadcasting with a ring master a transaction that sets all nodes to node 0;

setting with said ring master values N=0 and M=1;

sending a transaction with said ring master such that node N becomes node M;

comparing with each node a transaction value to determine if the node is node N, and if it is node N, then unconditionally asserting the transaction used value on the node output; and if the transaction used value has not already been asserted, then performing the requested change of node number at said node;

setting with the ring master M=M+1; and continuing until said ring master receives said transaction back unused, indicating that there are M nodes on the ring, where that the ring master is node 0.

15. An apparatus for initializing a communications network having a ring topology, comprising:

a ring master for each ring in said ring topology, wherein the ring master communicates with all network nodes to assign each node a unique node number;

means for asserting a signal with said ring master by holding a line for a predetermined length of time upon system power up, after all system clocks become stable;

means for receiving said asserted signal at each node when said node is ready for operation; and means for forwarding said asserted signal, wherein subsequent receipt of the asserted signal by the ring master indicates that the ring is operating properly.

16. The apparatus of claim 15, further comprising:

means for padding the ring to a correct number of slots; and means for assigning a unique identity to each node on the ring.

17. The apparatus of claim 15, further comprising:

means for determining how many nodes are on the ring.

18. The apparatus of claim 17, said means for determining further comprising:

means for broadcasting with said ring master a transaction that sets all nodes to node 0;

means for setting with said ring master values N=0 and M=1;

means for sending a transaction with said ring master such that node N becomes node M;

means for comparing with each node a transaction value to determine if the node is node N, and if it is node N, then unconditionally asserting the transaction used value on the node output; and if the transaction used value has not already been asserted, then performing the requested change of node number at said node;

means for setting with the ring master M=M+1; and means for continuing until said ring master receives said transaction back unused, indicating that there are M nodes on the ring, where the ring master is node 0.

19. The apparatus of claim 16, wherein said means for padding further comprises:

means for sending with said ring master a begin buffering transaction to assure that a number of clock cycles on the ring is kept constant;

means for sending with said ring master a count clocks transaction to count a number of clocks on the ring after buffering is begun;

means for initializing all nodes on said ring when said ring master knows how many clocks reside on the ring;

means for sending with said ring master a ring up transaction, which notifies all nodes that the ring is ready for use for normal boot up transactions; and means for beginning to forward any transactions said ring master receives when the ring master receives its own ring up transaction from the ring.

20. The apparatus of claim 15, further comprising:

means for sending a fetch request from a node; and means for track switching said request when the request reaches the ring master.

21. The apparatus of claim 15, further comprising:

means for reading from a boot address at each node;

means for receiving a positive acknowledgment at one node of its read;

means for attaching a positive response to a transaction with said one node;

means for directing all requests to the correct node on the correct ring with said ring master;

means for sending requests for fetches on any ring for nodes that are performing instruction fetches;

means for track switching said requests to a correct ring with said ring master upon receiving the instruction fetch request;

means for designating a transaction for a node containing a boot code;

means for taking the transaction with the node having the boot code;

means for responding to the transaction on the same ring on which it is received;

means for taking the response with the ring master; and means for returning the response on the same ring on which the ring master received the request, such that the response is thus sent to the requestor.

22. The apparatus of claim 15, further comprising:

means for forwarding a request to a given node when a node receives a request for boot instructions or data;

means for track switching the request with said given node to all rings;

means for sending the request with all nodes onto respective node buses; and means for sending the response to the given node on the ring on which it was received from the node that receives a response to the request.

23. The apparatus of claim 15, further comprising:

means for providing a system signal to said ring master to specify that sufficient time has passed, such that all rings are functional.

24. The apparatus of claim 15, further comprising:

means for setting N=1 with the ring master;

means for sending a transaction with the ring master;

means for receiving said transaction at a downstream recipient node;

means for setting a used bit in a following slot if the recipient node has not already been configured;

means for configuring the recipient node as node N if the recipient node is not already configured and the used bit that it set is not already set when received;

means for receiving the transaction at the ring master;

means for noting the used bit at the ring master;

means for setting N=N+1; and means for repeating the foregoing steps until the ring master receives a transaction without a used bit set.

25. The apparatus of claim 15, further comprising:

means for sending a first transaction with the ring master that causes all nodes to become node 0;

means for sending a second transaction with the ring master that causes each recipient node to generate a command that requires the recipient node to increment its node number by one; and means for counting with the ring master the number of increment commands it receives;

wherein the ring master is node 0, a next downstream neighbor is node 1, and node numbers are incremented around the ring in a linear fashion.

26. The apparatus of claim 15, further comprising:

means for broadcasting a CONFIG (set to 0) transaction to all nodes with said ring master;

means for setting N=0 with said ring master;

means for sending a CONFIG (node N tell node N to become node N+1) transaction with said ring master that causes all receiving nodes that are currently node N to broadcast a CONFIG (node N become node N+1) transaction;

means for setting N=N+1 with said ring master;

means for repeating the foregoing steps until the ring master receives its CONFIG (node N tell node N to become node N+1); and means for creating a monotonically increasing node number list in successive iterations, in which no duplicates are present.

27. The apparatus of claim 15, further comprising:

means for sending a transaction with the ring master; and means for counting a number of ring clocks at the ring master until the transaction returns to the ring master.

28. An apparatus for determining how many nodes are on a ring, comprising:

means for broadcasting with a ring master a transaction that sets all nodes to node 0;

means for setting with said ring master values N=0 and M=1;

means for sending a transaction with said ring master such that node N becomes node M;

means for comparing with each node a transaction used value to determine if the node is node N, and if it is node N, then unconditionally asserting the transaction used value on the node output; and if the transaction value has not already been asserted, then performing the requested change of node number at said node;

means for setting with the ring master M=M+1; and means for continuing until said ring master receives said transaction back unused, indicating that there are M nodes on the ring, where the ring master is node 0.

* * * * *